United States Patent [19]

Weber

[11] 4,170,830
[45] Oct. 16, 1979

[54] FEELER FOR MEASURING LENGTHS
[75] Inventor: Karl-Heinz Weber, Hückeswagen, Fed. Rep. of Germany
[73] Assignee: W. Ferd. Klingelnberg Söhne, Remscheid, Fed. Rep. of Germany
[21] Appl. No.: 869,946
[22] Filed: Jan. 16, 1978
[30] Foreign Application Priority Data
Jan. 14, 1977 [DE] Fed. Rep. of Germany ....... 2701377
[51] Int. Cl.² ............................ G01B 5/20; G01B 7/28
[52] U.S. Cl. .............................. 33/174 P; 33/174 PC; 33/179.5 R
[58] Field of Search ............. 33/174 R, 174 L, 174 P, 33/174 PC, 172 B, 179.5 R, 179.5 D

[56] References Cited
U.S. PATENT DOCUMENTS

| 1,564,589 | 12/1925 | Laessker | 33/179.5 D |
| 3,514,869 | 6/1970 | Kelling | 33/174 R |
| 3,714,715 | 2/1973 | Coes, Jr. | 33/174 R |
| 3,945,126 | 3/1976 | Bloch | 33/179.5 R |

FOREIGN PATENT DOCUMENTS 141320 10/1960 U.S.S.R. .............................. 33/179.5 R

OTHER PUBLICATIONS

Boerger et al., "Balance Beam Probe Assembly for Measuring Three-Dimensional Surface Profiles", W. Electric Tech. Dig., No. 32, 10-1973, pp. 11 & 12.

Primary Examiner—Richard R. Stearns
Attorney, Agent, or Firm—Becker & Becker, Inc.

[57] ABSTRACT

A feeler for measuring lengths operable in a controlled measuring direction provided as an additional device for two-coordinates measuring heads. The feeler includes a feeler lever which has one end designed as a circular feeler tip for feeling engagement with the workpiece to be measured. The feeler is mounted in a bi-valent joint on a base plate carried by the measuring head which joint permits a displacement of the feeler tip in the measuring plane in any desired direction. The other end of the feeler lever is linked to a straight line guide which is mounted on a disc arranged on the base plate so as to be rotatable by any desired angle about an axis extending in a direction perpendicular to the measuring plane. At the above mentioned other end the feeler lever is subjected to a measuring force which acts in the direction of the straight line guide. The disc has connected thereto an indicator for measuring the displacement of the above mentioned other end.

8 Claims, 3 Drawing Figures

FEELER FOR MEASURING LENGTHS

The present invention relates to a feeler for measuring lengths operable in a controlled measuring direction provided as an additional device for two coordinate measuring heads. With devices of this type a measuring signal is generated which at any location is proportional to the deviation between a plane reference curve and the contour of the object to be measured. For this purpose the measuring head moves in a manner known per se along the reference curve while the feeler tip is held in continuous engagement with the object to be measured by a measuring force. In this way the deviations between a rated profile shape and the actual profile shape of a workpiece are measured directly. The measuring direction of the feeler for measuring lengths must controllably be variable if the deviations are to be obtained at any profile curve in conformity with certain mathematical interrelationships, for instance, always perpendicular to the rated profile. These devices have to be differentiated from those in which the measuring head automatically follows the actual profile of the object to be measured, instead of the rated profile, and determines the actual profile by coordinates. The deviations are then ascertained by calculation with regard to the stored rated profile. The feeler employed in this connection merely serves as feeling member for the necessary subsequent control of the measuring head. The feeler emits a signal only until the measuring head with its reference point has reached the rated profile.

Measuring devices comprising a feeler for measuring the lengths operable with controlled measuring direction for two coordinate measuring heads have become known which, when moving over the rated profile, continuously turn a simple indicator by means of a cam into the desired measuring direction. Such a device has the drawback that very precise master curves are required which for each measuring problem have to be prepared individually at great expenses.

Furthermore, measuring heads, especially on large measuring machines, have become known which can controllably turn about an axis. If a simple feeler for measuring lengths is connected to such last mentioned measuring head, each desired measuring direction can be aimed at when moving over a contour in the pertaining plane perpendicular to the axis of rotation. Aside from the high expenses involved in connection with such devices, this measuring structure cannot be used in the following instances: If small substantially hollow workpiece contours, such as tooth gashes or groove profiles, have to be measured completely, the measuring direction changes over a wide range, and the axis of rotation of the measuring head would have to be brought closely to the hollow profile and even into the same.

This requirement can fundamentally not be met for reasons of space when the entire feeler is located in the measuring plane, because in such an instance it would have to be considerably smaller than the gap or the groove, the profile of which is to be measured. Therefore, in such an instance, frequently a special feeler is employed of which only the stylus extends into the measuring plane, or a lever is interposed in order to position the feeler in a plane parallel to deviate toward the measuring plane. However, these solutions also are not suitable when the workpiece extends very far so that the measuring device would be too unstable, and the desired measuring accuracy could not be obtained or when the profile is not accessible in the respective direction, for instance, because of great helix.

It is, therefore, an object of the present invention to provide a feeler for measuring lengths operable with controlled measuring direction, which is substantially to be arranged in the measuring plane and is able during one measuring operation to measure plane hollow workpiece contours which are smaller than the entire measuring feeler.

This object and other objects and advantages of the invention will appear more clearly from the following specification in connection with the accompanying drawings, in which.

Figure 1:
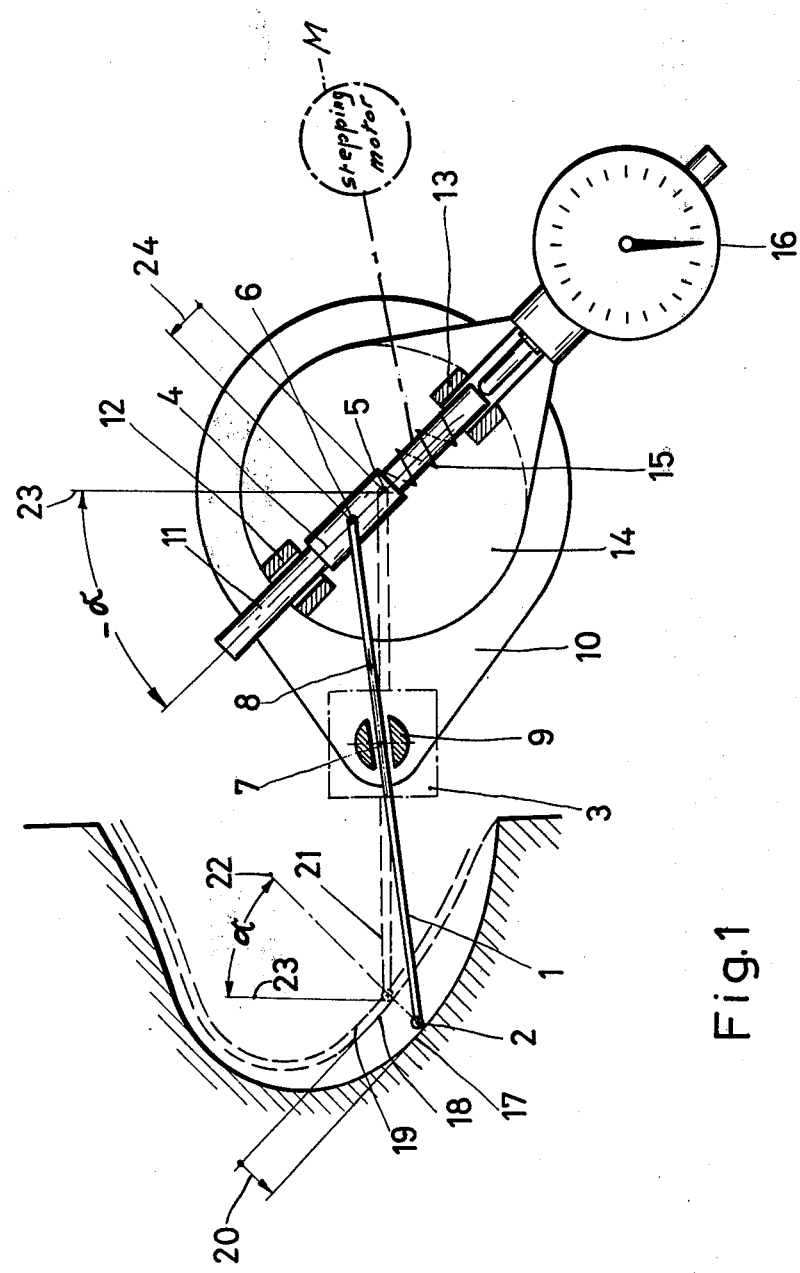
FIG. 1 represents a diagrammatic illustration of a feeler for measuring lengths according to the invention with a swivel-thrust joint.

The feeler for measuring lengths according to the present invention is characterized primarily by a feeler lever located in the measuring plane and having its circular feeler tip in engagement with the workpiece to be checked, while the feeler lever is in the first place journalled in a bivalent (zweiwertig) joint directly on a base plate, this joint permitting a displacement of the feeler tip in the measuring plane in any desired direction. The feeler lever has, in the second place, its other end linked to a straight line guiding means which latter is mounted on a disc and, while being rotatable by any desired angle about an axis perpendicular to the measuring plane, is connected to the base plate. The feeler lever is at its linkage point subjected to a measuring force which acts in the direction of the straight line guiding means while the displacement of the linkage point can be measured by means of a displacement sensing device connected to the disc.

The operation of the claimed length measuring feeler consists in that during the rotation of the straight line guiding means the "measuring direction" seems to rotates at the circular feeler tip about an axis perpendicular to the measuring plane, the axis passing through the center point of the feeler tip in its zero position. It is no longer necessary to turn the entire feeler into the desired measuring direction. Therefore, the feeler tip and thus the axis of rotation can now without encountering space difficulties be moved into the gap profile to be checked and, if necessary, even up to the bottom thereof. The remaining elements of the feeler according to the invention are located outside the gap profile but in the direct vicinity of the measuring plane in which the feeler lever is located. This results in a stable construction which is relatively simple when considering the measuring problem.

During the checking operation the two-coordinate measuring head carrying the feeler moves in a manner known per se, program-controlled point after point, along a reference curve. In the mean time, preferably a stepping motor turns the disc with the straight line guiding means in conformity with a mathematical interrelationship accordingly programmed into a control unit in such a way that the required measuring direction is obtained at the feeler tip. Generally the measurements have to be carried out at each point perpendicular to the rated profile.

According to a further development of the measuring feeler according to the invention, it is provided that when the feeler lever is not deflected, its linkage point in the straight line guiding means coincides with the axis of rotation of the straight line guiding means. When moving over an object to be checked having a profile free from errors, the feeler lever will, in spite of the rotation of the straight line guiding means, i.e. changing measuring direction, nevertheless not move out of its zero position and therefore no deviations can be indicated. The reference curve over which the feeler lever moves will then be the equidistant to the rated profile. This results from the radius of the circular feeler tip and can be realized without difficulties by the control unit of the two-coordinate measuring head.

When the feeler lever moves over a profile containing errors the feeler tip will deviate out of its zero position in order to remain in constant contact with the object to be checked. This causes the linkage point of the feeler lever to move in the direction of the straight line guiding means thus giving the feeler tip its measuring direction. One of the advantages of the solution according to the invention is, that, in spite of the fact that any desired rotary position of the straight line guiding means is possible, the measuring force always acts upon the feeler lever in the direction of movement of the feeler lever-linkage point within the straight line guiding means.

Inasmuch as the magnitude of the displacement of the linkage point in the straight line guiding means is, according to a further development of the feeder for measuring lengths of this invention, equal to the measuring deviation of the feeler tip, this magnitude can be measured directly in the straight line guiding means, so that the known contact-free inductive or digital displacement pickups can be employed.

The above mentioned bivalent joint can be designed in two different ways. The first design is based on the fact that the bivalent joint is a rotation-thrust joint the rotation axis of which is located perpendicular to the measuring plane between the straight line guiding means and the feeler tip while the thrust axis of this joint coincides with the connecting line between the linkage point in the straight line guiding means and the center point of the feeler tip. The feeler lever located in the measuring plane will then follow in its kinematics substantially the principle of a two-arm lever. Thus, between the measuring direction at the feeler tip and the pertaining angle position of the straight line guiding means, there exists the interrelationship that with regard to a common reference direction the angles are inversely equal to each other.

According to a further advantageous development of this first design, the length of the feeler lever between the linkage point in the straight line guiding means and the center point of the feeler end is twice as great as the distance between the axis of rotation of the straight line guiding means and the axis of rotation-thrust joint.

In each measuring direction the measuring deviation of the feeler tip will then equal the displacement of the linkage point in the straight line guiding means. The minor deviations obtained due to the fact that the feeler tip does not always move precisely along a straight line in the measuring direction and that the lever ratio does not precisely remain 1:1, are negligible, since, when employing the feeler for measuring lengths according to the invention, the maximum measuring deviation is very small with regard to the length of the feeler lever.

According to the second design the bivalent joint is a cross guiding means so that the feeler lever can shift only parallel to itself in the measuring plane. According to this design the direction of shift or displacement, i.e. the measuring direction, is equal to the direction of the straight line guiding means. Similarly, the amount of the measuring deviation also must always precisely equal the displacement of the linkage point in the straight line guiding means.

According to an advantageous feature of the second design the linkage point of the non-deflected feeler lever in the straight line guiding means does not coincide with the rotational axis, but is offset relative thereto by the amount of the radius of its circular feeler tip and, opposite to the direction of the measuring force. This feature brings about that the reference curve over which the two-coordinate measuring head has to move, directly corresponds to the rated profile and accordingly it is not necessary to convert to an equivalent distance.

The second design may also be further developed so that the rotatable straight line guiding means and the cross guiding means are arranged in planes parallel to the measuring plane and one above the other so that, when the feeler lever is not deviated or deflected, its linkage point is located above the crossing point of the cross guiding means. This results in the great advantage that, with the same overall size of the measuring feeler, the torque acting upon the feeler lever in view of the measuring force can be supported over great guiding lengths. Accordingly, because a certain friction is unavoidable, a better transfer in the moved measuring elements can be obtained, while the measuring force, however, is being applied centrally thereof.

The invention will now be described in connection with the accompanying drawings showing the most important functional elements diagrammatically only. It is further to be understood that these elements have to be designed in conformity with the measuring machine design, as for instance the indicator which serves as a symbol for a displacement pickup or the bearing and guiding means which have to be free of backlash and which have to have a low friction.

More specifically, in FIG. 1, as well as in the remaining figures, the drawing plane represents the measuring plane of the feeler for measuring lengths. The inclination of the measuring plane is predetermined in a manner known per se by the possibilities of movement of the two-coordinate measuring head. A feeler lever 1 located in this measuring plane and provided with a circular feeler end 2 is journalled in a bivalent joint 3 on a base plate 10 which is rigidly connected to the measuring head not shown in detail. The bivalent joint 3 is a rotation-thrust joint because the feeler lever 1 is guided by a link member 9 which permits a displacement of the feeler lever 1 in the measuring plane along the axis 8 and which itself can turn in the base plate 10, while the axis of rotation 7 is perpendicular to the measuring plane. The feeler lever 1 is furthermore rotatably connected to a bar 11 in the linkage point 6. This bar 11 together with the bearing sleeves 12, 13 forms a straight line guiding means 4 and is mounted on a disc 14 which is rotatable about an axis 5 perpendicular to the measuring plane and which is mounted on the base plate 10. A pressure spring 15 between the bearing sleeve 13 and a collar on the bar 11 generates a measuring force in the direction of the straight line guiding means 4. The displacement of the bar 11 is measured by a measuring indicator 16 which is likewise connected to the disc 14.

In addition to the feeler for measuring lengths, FIG. 1 also shows the rated profile 17 of a workpiece engaged by the feeler tip 2. Inasmuch as the actual profile 17 at this point differs from the rated profile 18, the feeler tip 2 is in the measuring direction displaced from its zero position 21 by the measuring deviation 20. The required measuring direction in this instance is determined by the normal 22 to the rated profile 18 and forms the angle α with its reference direction 23. On the feeler for measuring lengths, the measuring direction is set by rotation of the disc 14 with the straight line guiding means 4 by the angle α with regard to the reference direction 23. The measuring deviation 20 has associated therewith an equally great displacement 24 of the bar 11 which can be read on the indicator 16. In order to reach the next measuring point, the two-coordinate measuring head and thus the center point of the feeler tip 2 moves along the equidistant 19 to the rated profile 18. At the same time the disc 14 is turned in conformity with the new measuring direction. This operational course shows how, with a feeler for measuring lengths according to the invention and in cooperation with known electronic auxiliary devices, a profile measuring can be carried out in a simple and safe manner.

Figure 2:
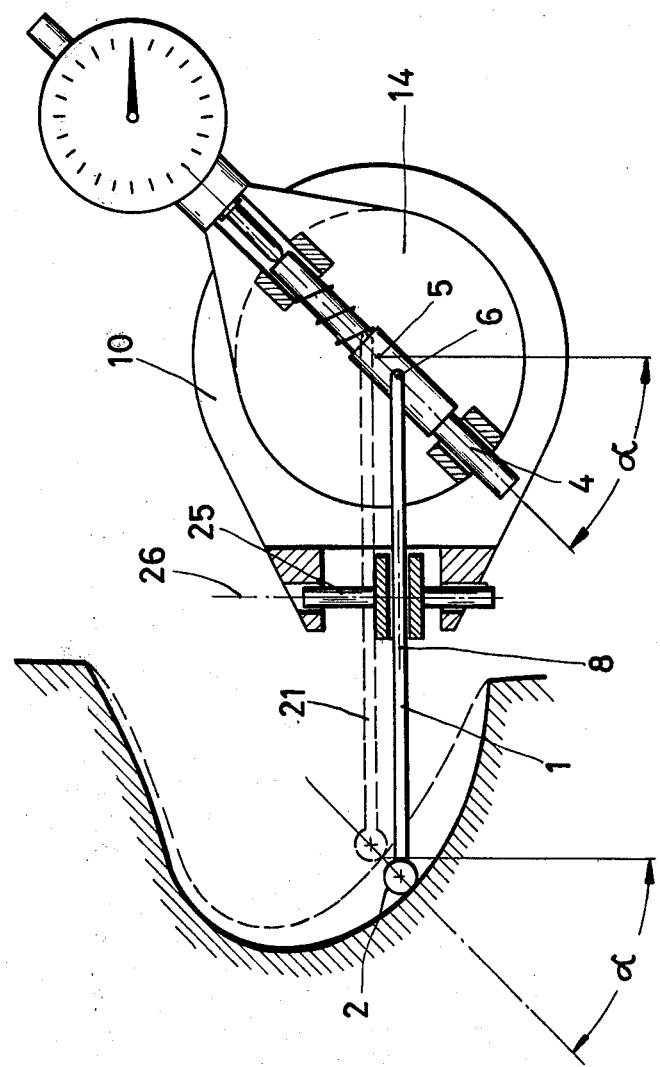
FIG. 2 is a diagrammatic illustration of a feeler for measuring lengths according to the invention provided with a cross guide.

FIG. 2 shows a feeler for measuring lengths according to which in contrast to the design of FIG. 1 the bivalent joint 3 is designed as cross guiding means. The feeler lever 1 is guided in a joint member 25 which again permits a displacement of the feeler lever in the measuring plane along the axis 8, which joint member 25 is, adapted on the base plate 10, but movable along an axis 26 which is located in the measuring plane and extends perpendicular to the axis 8. Furthermore, in the zero position 21 of the feeler lever 1 its linkage point 6 does not coincide with the axis of rotation 5 of the disc 14 but is offset relative thereto by the amount of the radius of its circular feeler tip 2. This brings about that each displacement of the feeler lever is effected parallel to its zero position 21 and that the measuring direction at the feeler end 2 equals the direction of the straight line guiding means 4. Furthermore, the length of the feeler lever 1 has no influence upon the measuring operation and in this instance, the measuring head has to move along the rated profile in order to have, with non-deviated feeler lever, the momentary contact point at the feeler end also describes the rated profile.

Figure 3:
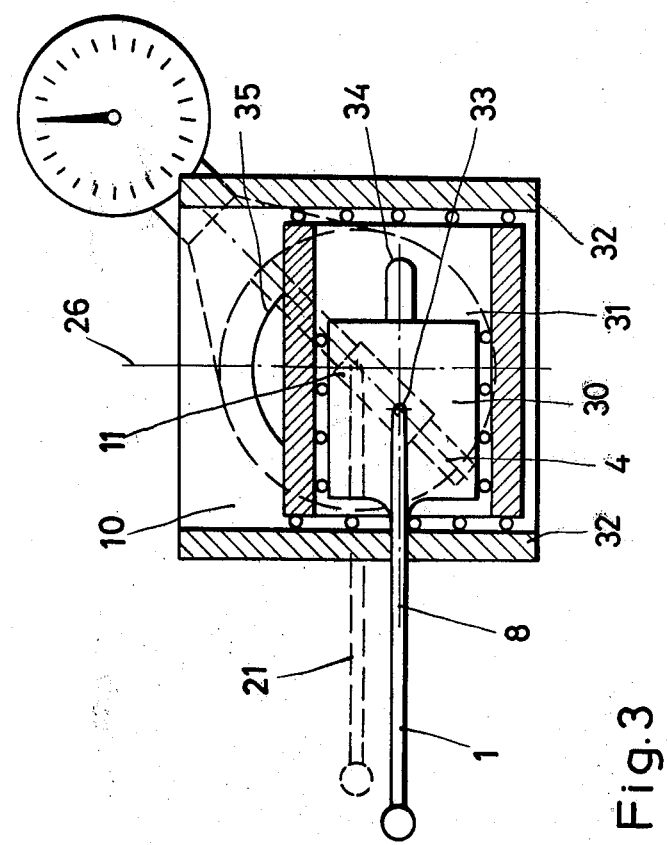
FIG. 3 is a diagrammatic illustration of a feeler for measuring lengths according to FIG. 2 but with the cross guide superimposed with a rotatable straight line guiding means.

With the feeler according to FIG. 3 the feeler lever 1 is rigidly connected to a first carriage 30 which in the direction of the axis 8 can be displaced in a second carriage 31. This second carriage 31 moves along the axis 26 perpendicular to the first carriage and likewise in a plane parallel to the measuring plane on the base plate 10 provided with corresponding guiding means 32. The rotatable straight line guiding means is again connected to the base plate, but in this instance from below. The feeler lever 1 is connected to the bar 11 of the straight line guiding means by a bolt 33 wherefore the carriage 31 and the base plate 10 are provided with corresponding openings 34,35. With this design it is of foremost importance that the bivalent joint which forms a cross guiding means and is formed by the two carriages 30,31 is located above the straight line guiding means, and that the crossing point of the axes 8 and 26 coincides with the bolt 33 when the feeler lever occupies its zero position 21.

It may be added that the disc 14 is rotated by a stepping motor M which is electronically controlled in the same manner as with heretofore known measuring devices of the type set forth in the introductory portion of the present description, so that the stepping motor rotates in conformity with a certain mathematical relationship. More specifically, said stepping motor must rotate in a certain mathematical relationship with regard to the displacement carried out by said known two coordinate measuring head. Furthermore, in practice, the measuring indicator clock 16 is advantageously replaced by a contact-free inductive or digital stroke pick-up.

The operation of the feeler according to the invention may now be briefly summarized. Assuming that a certain profile of a workpiece is to be measured and that the profile of the rated workpiece is known. A two-coordinate measuring head known per se, namely a table which is movable simultaneously in two directions of a plane, is employed to scan the rated profile while simultaneously the feeler according to the invention which is arranged upon said two-coordinate measuring head, by means of its feeler lever feels the workpiece to be measured and follows the measuring direction while it passes along the curve to be measured. Both the movement of the two-coordinate measuring head and of the feeler according to the invention are electronically coordinated in a manner as it is well known with the heretofore known measuring devices set forth as prior art in the introduction of the present specification.

Heretofore, a rigid measuring feeler was employed which can always measure in a single direction only. In contrast thereto, the measuring feeler 1 of the present invention, which can measure in different direction, is predirected or preset as to the direction in which it is intended to measure, normally perpendicular to the profile of the workpiece to be measured. The turning of the straight-line guide 4 and feeler lever 1 pivotally connected thereto is effected by the stepping motor M which similar to said two-coordinate measuring head is preferably by the same punch strip or the like electronically controlled since, as mentioned before, both devices have to operate in a definite coordination with each other. The electronic devices which bring about that the stepping motor rotates in coordination with the measuring head are well known with the prior art referred to in the introductory part of the present specification. Only the measuring feeler claimed in the appended claims which is mounted on the two-coordinate measuring head represents the present invention.

It is, of course, to be understood that the present invention is, by no means, limited to the specific showing in the drawings but also comprises any modifications within the scope of the appended claims.

What I claim is:

1. A feeler for measuring lengths with controlled measuring direction which includes: a feeler lever movable from a zero position representing its non-deviated position into a plurality of positions deviating therefrom, said feeler lever having a first end and a second end, said first end forming a substantially circular feeler tip for feeling engagement with the workpiece to be measured, a base plate, a bi-valent joint carried by said base plate and permitting a displacement of said first end in the measuring plane in any desired direction, a disc rotatably mounted on said base plate and rotatable about an axis perpendicular to said measuring plane, straight line guiding means mounted on said disc including a longitudinally movable member, said member having linked thereto said second end of said feeler lever at a linkage point, thrust means acting upon the movable member in the longitudinal direction of said straight line guiding means and upon the movable member, and displacement sensing means connected to said disc for measuring the longitudinal displacement of said linkage point.

2. A feeler according to claim 1, which includes a stepping motor fixed to said base plane for rotating said disc according to a desired program.

3. A feeler according to claim 1, in which in said zero position said linkage point is located in the axis of rotation of said disc.

4. A feeler according to claim 1, in which said bi-valent joint is a rotation-thrust joint having an axis of rotation extending perpendicular to the measuring plane between said straight-line guiding means, and said first end of said feeler lever, said bi-valent joint having a thrust axis coinciding with the connecting line interconnecting said linkage point and the center of said first end of said feeler lever.

5. A feeler according to claim 4, in which the length of said feeler lever between said linkage point and the center point of said first end of said feeler lever equals twice the distance between the axis of rotation of said disc and the axis of rotation of said rotation-thrust joint.

6. A feeler according to claim 1, in which said bi-valent joint is a cross guiding means.

7. A feeler according to claim 6, in which in said zero position of said feeler lever the linkage point of the latter is offset relative to the axis of rotation of said disc opposite to the direction of action of said thrust means by the length of the radius of said first end of the feeler lever.

8. A feeler according to claim 6, in which said rotatable straight-line guiding means and said cross guiding means are arranged one above the other so that in a zero position of said feeler lever the linkage point of the latter is located above the crossing point of said cross guiding means.

* * * * *